United States Patent
Haig

(10) Patent No.: US 9,710,845 B2
(45) Date of Patent: Jul. 18, 2017

(54) E-COMMERCE PURCHASE PORTAL

(71) Applicant: 3M INNOVATIVE PROPERTIES COMPANY, Saint Paul, MN (US)

(72) Inventor: Keith R. Haig, Afton, MN (US)

( * ) Notice: Subject to any disclaimer, the term of this patent is extended or adjusted under 35 U.S.C. 154(b) by 0 days.

(21) Appl. No.: 14/375,643

(22) PCT Filed: Feb. 15, 2013

(86) PCT No.: PCT/US2013/026429
§ 371 (c)(1),
(2) Date: Jul. 30, 2014

(87) PCT Pub. No.: WO2013/123389
PCT Pub. Date: Aug. 22, 2013

(65) Prior Publication Data
US 2015/0019385 A1 Jan. 15, 2015

Related U.S. Application Data

(60) Provisional application No. 61/599,024, filed on Feb. 15, 2012.

(51) Int. Cl.
*G06Q 30/00* (2012.01)
*G06Q 30/06* (2012.01)
(Continued)

(52) U.S. Cl.
CPC ......... *G06Q 30/0635* (2013.01); *G06F 17/30* (2013.01); *G06F 17/3089* (2013.01);
(Continued)

(58) Field of Classification Search
CPC ........... G06Q 30/0601; G06Q 30/0633; G06Q 30/0635; G06Q 30/0603; G06Q 30/0623;
(Continued)

(56) References Cited

U.S. PATENT DOCUMENTS

| | | | |
|---|---|---|---|
| 7,072,859 B1 | 7/2006 | Huber | |
| 7,333,944 B1 | 2/2008 | Harris | |
| 2003/0120505 A1* | 6/2003 | Spiegel | ............... G06Q 10/083 705/28 |
| 2004/0111337 A1 | 6/2004 | Feeney | |
| 2008/0294535 A1* | 11/2008 | Berlin | .................... G06Q 30/00 705/26.2 |
| 2011/0029406 A1* | 2/2011 | Harris | .................... G06Q 30/00 705/26.41 |

(Continued)

FOREIGN PATENT DOCUMENTS

WO WO 02-073492 9/2002

OTHER PUBLICATIONS

Badrakhan, Beth. Data-Driven Vendor-Managed Inventory. Jun. 1, 2010 (Jun. 1, 2010). Accessed via ProQuest.*

(Continued)

*Primary Examiner* — Jeffrey A Smith
*Assistant Examiner* — Allison Wood

(57) ABSTRACT

In an example, aspects of this disclosure relate to a process for electronic commerce that includes providing, at a website of a manufacturer, an indication of one or more products for sale by the manufacturer, wherein the one or more products are distributed by a distributor that is distinct from the manufacturer. The process also includes receiving an indication of an intent to purchase the one or more products by a customer and an identification number that uniquely identifies the customer, and, in response to receiving the indication of the intent to purchase and the customer identification number, generating order information comprising data identifying the one or more products and data identifying the customer. The process also includes initiating an order with the distributor using the order information without transitioning to a website of the distributor.

14 Claims, 6 Drawing Sheets

(51) Int. Cl.
*G06Q 10/08* (2012.01)
*G06F 17/30* (2006.01)

(52) U.S. Cl.
CPC .. *G06F 17/30861* (2013.01); *G06F 17/30908* (2013.01); *G06Q 10/0834* (2013.01); *G06Q 10/0835* (2013.01); *G06Q 30/0601* (2013.01); *G06Q 30/0603* (2013.01); *G06Q 30/0623* (2013.01); *G06Q 30/0641* (2013.01)

(58) Field of Classification Search
CPC ........... G06Q 30/0641; G06Q 10/0834; G06Q 10/0835; G06F 17/30; G06F 17/30861; G06F 17/30908; G06F 17/3089
USPC ................ 705/26.1–27.2, 336, 334; 707/607
See application file for complete search history.

(56) References Cited

U.S. PATENT DOCUMENTS

2011/0119088 A1\* 5/2011 Gunn .................... G06F 19/322
705/3

OTHER PUBLICATIONS

Extended European Search Report for European Patent Application No. 13749641.0, dated Mar. 10, 2016.
"Computer Network," from Wkipedia, http://en.wikipedia.org/w/index.php?title=Computer_network&ol . . . , Dec. 5, 2014.
International Search Report for PCT International Application No. PCT/US2013/026429 mailed on Apr. 26, 2013, 2 pages.

\* cited by examiner

E-COMMERCE PURCHASE PORTAL

CROSS REFERENCE TO RELATED APPLICATIONS

This application is a national stage filing under 35 U.S.C. 371 of PCT/US2013/026429, filed Feb. 15, 2013, which claims priority to U.S. Provisional Application No. 61/599,024, filed Feb. 15, 2012, the disclosures of which are incorporated by reference in their entirety herein.

This application claims priority to U.S. Provisional Application No. 61/599,024, filed 15 Feb. 2012, the entire content of which is hereby incorporated by reference.

TECHNICAL FIELD

This disclosure relates to electronic commerce.

BACKGROUND

Manufacturers may sell products through one or more distributors, rather than selling the products directly to an end customer. Manufacturers who sell products through distributors or separate retailers may face challenges in converting web-based marketing into a purchase decision by a customer. For example, a potential customer may intend to purchase a product at the website of the manufacturer. However, in order to complete the purchase, the customer may be transitioned from the website of the manufacturer to the website of the distributor. In some instances, the customer may lose the purchase intent upon leaving the website of the manufacturer.

In some examples, a manufacturer may provide a number of hyperlinks to a website of a distributor or retailer. However, once at the website of the distributor or retailer, the customer may be distracted and purchase a product of a competitor. In other examples, a manufacturer may allow the customer to load a basket of goods at the website of the manufacturer. Instead of directing the customer to a checkout line at the website of the manufacturer, however, the manufacturer may transfer the customer directly to the checkout line of a distributor or retailer.

SUMMARY

Aspects of this disclosure generally relate to providing a mechanism that allows a customer to purchase a product of a manufacturer without transitioning the customer to a distributor for the manufacturer that ultimately completes the order. For example, aspects of this disclosure relate to a website that allows a customer to select products of the manufacturer for purchase. When completing an order at the website of the manufacturer, the customer may enter information that identifies the customer into the website. Using the identifying information, the website may compile information necessary to successfully complete the order. In some instances, the website may identify a distributor customer number associated with the customer that uniquely identifies the customer at the distributor. The website may then send the compiled information to the distributor, which completes the order.

In this way, the techniques of this disclosure may be used to capture a purchase intention of a customer while the customer is accessing the website of the manufacturer and without directing the customer to a website of the distributor to complete the order. Accordingly, the manufacturer may facilitate processing, fulfillment, and billing of the order through a distributor "behind the scenes," while the customer remains at the website of the manufacturer.

In an example, aspects of this disclosure relate to a method for electronic commerce that includes providing, at a website of a manufacturer, an indication of one or more products for sale by the manufacturer, wherein the one or more products are distributed by a distributor that is distinct from the manufacturer; receiving, at the website of the manufacturer, an indication of an intent to purchase the one or more products by a customer and an identification number that uniquely identifies the customer; in response to receiving the indication of the intent to purchase and the customer identification number, generating order information comprising data identifying the one or more products and data identifying the customer; and initiating an order with the distributor using the order information without transitioning to a website of the distributor.

In another example, aspects of this disclosure relate to a computer-readable medium storing instructions that, when executed, cause one or more processors to provide, at a website of a manufacturer, an indication of one or more products for sale by the manufacturer, wherein the one or more products are distributed by a distributor that is distinct from the manufacturer; receive, at the website of the manufacturer, an indication of an intent to purchase the one or more products by a customer and an identification number that uniquely identifies the customer; in response to receiving the indication of the intent to purchase and the customer identification number, generate order information comprising data identifying the one or more products and data identifying the customer; and initiate an order with the distributor using the order information without transitioning to a website of the distributor.

In another example, aspects of this disclosure relate to a system for conducting electronic commerce that includes an interface; and one or more programmable processors configured to provide an indication of one or more products for sale by a manufacturer, wherein the one or more products are distributed by a distributor that is distinct from the manufacturer; receive, at the interface, an indication of an intent to purchase the one or more products by a customer and an identification number that uniquely identifies the customer; in response to receiving the indication of the intent to purchase and the customer identification number, generate order information comprising data identifying the one or more products and data identifying the customer; and initiate an order with the distributor using the order information without transitioning to a website of the distributor.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Aspects of this disclosure generally relate to providing a mechanism that allows a customer to purchase a product of a manufacturer without transitioning the customer to a distributor for the manufacturer that ultimately completes the order. For example, aspects of this disclosure relate to a website that allows a customer to select products of the manufacturer for purchase. When completing an order at the website of the manufacturer, the customer may enter information that identifies the customer into the website. Using the identifying information, the website may compile information necessary to successfully complete the order. In some instances, the website may identify a distributor customer number associated with the customer that uniquely identifies the customer at the distributor. The website may then send the compiled information to the distributor, which completes the order.

In this way, the techniques of this disclosure may be used to capture a purchase intention of a customer while the customer is accessing the website of the manufacturer and without directing the customer to a website of the distributor to complete the order. Accordingly, the manufacturer may facilitate processing, fulfillment, and billing of the order through a distributor "behind the scenes," while the customer remains at the website of the manufacturer.

Figure 1:
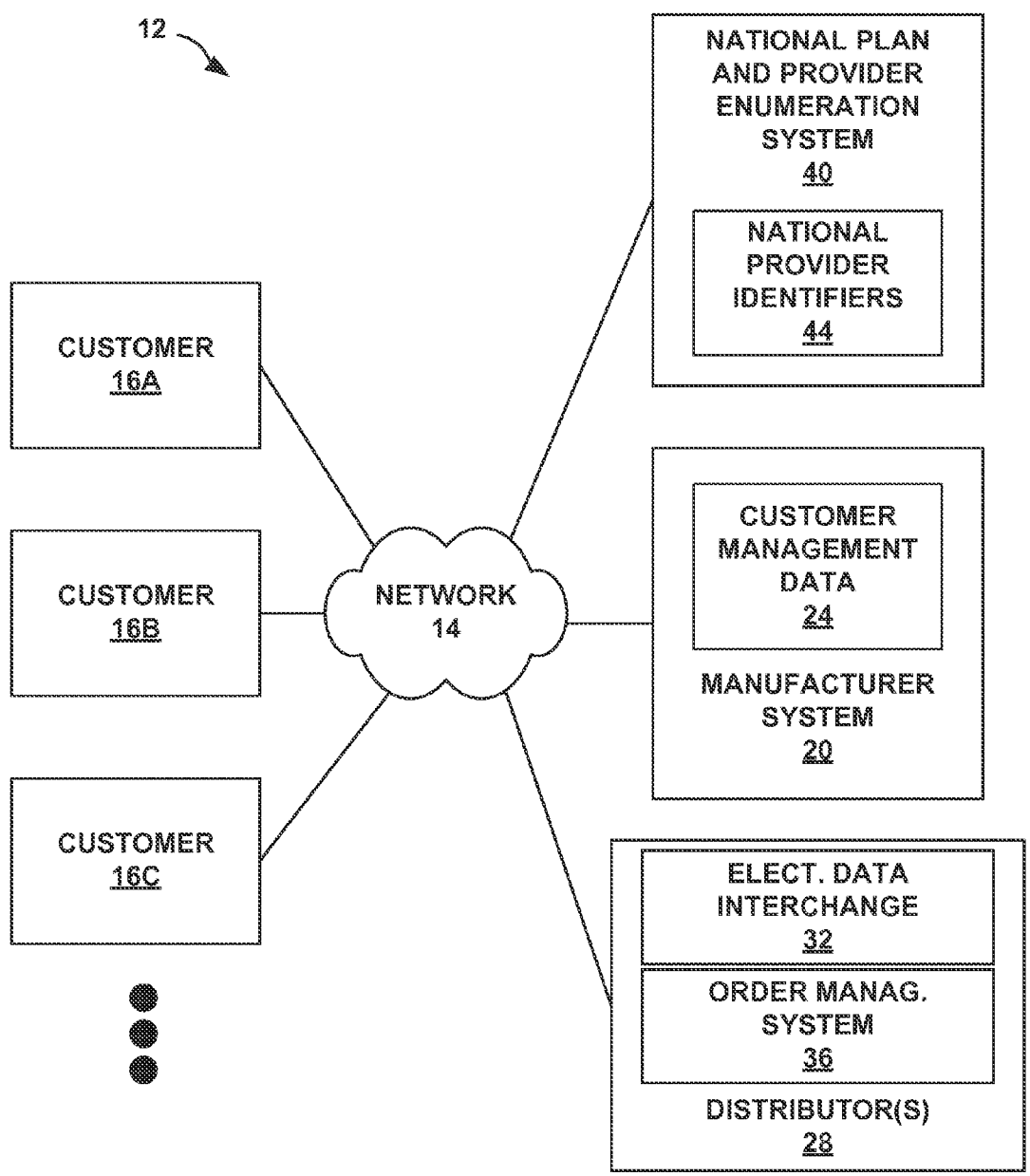
FIG. 1 is a block diagram illustrating a system for fulfilling product orders by a manufacturer, according to aspects of this disclosure.

FIG. 1 is a block diagram illustrating a system 12 for fulfilling product orders by a manufacturer, according to aspects of this disclosure. System 12 generally includes network 14 that allows customers 16A-16N (collectively, customers 16) to communicate with a manufacturer system 20 having a customer management system 24 to purchase products of the manufacturer. Orders received by manufacturer system 20 may be delivered by one or more distinct distributors 28 having an electronic data interchange 32 and order management system 36. In addition, in the example of FIG. 1, system 12 includes a national plan and provider enumeration system 40 that maintains a list of national provider identifiers 44.

Customers 16 represent any person or enterprise that may purchase products. In this manner, manufacturer system 20 may provide a centralized system that supports customers 16 of all sizes ranging from individuals to corporations. For example, in the medical or dental industry, customers 16 may include an individual dentist, doctor, or other medical professional, or a clinic that employs one or more dentists, doctors or medical professionals. Customers 16 may also include individuals working for or with a dentist, doctor, or medical professional. Each of the customers 16 may have one or more users that remotely interact with manufacturer system 20 via network 14 to purchase products developed by the manufacturer.

Each customer 16 typically interacts with a computing device suitable for communication and interaction with manufacturer system 20 via network 14. Example computing devices include any of a wide range of devices, including desktop computers, notebook (i.e., laptop) computers, tablet computers, set-top boxes, telephone handsets such as so-called "smart" phones, so-called "smart" pads, web-enabled televisions, or the like.

Network 14 represents any communication link suitable for communicating data, such as a wide-area network, local area network, or a global computer network like the World Wide Web. Network 14 may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication between components of system 12.

Manufacturer system 20 includes one or more data servers for providing an electronic commerce (e-commerce) portal for customers 16. For example, manufacturer system 20 may host a website that is accessible by customers 16 via network 14 to purchase products of the manufacturer. The website may list various products and describe the products to assist customers in making a purchasing decision. In instances in which the manufacturer produces medical or dental products, the website may list medical or dental products for purchaser by customers 16. As described in greater detail below, in some instances, customers 16 may require certain credentials (e.g., medical or dental accreditation) in order to purchase products listed on the website.

In one example, manufacturer system 20 may host a website that includes a "Buy It Now" (BIN) or similarly labeled option for initiating an order process. The BIN portal may allow customers 16 to initiate a purchase. For example, after customers 16 have enough information from the website to prompt a buying decision, manufacturer system 20 may transfer customers 16 from a product description to the BIN portal page.

According to aspects of this disclosure, the BIN portal includes at least two main functions. A first function is to briefly explain the purchasing process to customers 16. That is, information on the BIN portal may indicate that customers 16 will be generating a commitment to purchase, and that a purchase order will be sent to a distributor (such as distributors 28) of their choosing. A second function is to allow customers 16 to choose among distributors 28 participating in the program.

Manufacturer system 20 allows customers 16 to create custom direct and indirect product selections that include products of the manufacturer. In some instances, manufacturer system 20 may also allow customers 16 to select competitive products. This functionality allows customers 16 to select a particular feature that contains the preferred products that customers 16 use. Manufacturer system 20 may include a "shopping cart" or similar feature to hold the products until purchase. Accordingly, customers 16 may select a desired quantity, size, color, and the like of products and put the products in the shopping cart or list for later purchase.

As described in greater detail below, manufacturer system 20 may indicate the price for the product based on information provided by distributors 28. More particularly, manufacturer system 20 may list customer specific prices as maintained by a distributor 28 depending on the particular distributor 28 selected by customer 16. When customer 16 is finished shopping at the website of manufacturer system 20, customer 16 may initiate a function labeled, e.g., "send order to distributor" that initiates the process of transmitting the order from manufacturer system 20 to distributor 28.

Customer management data 24 may provide a variety of data associated with customers 16. In some instances, as described in greater detail below, customer management data 24 may include a database of customer information that may be accessed by Customer and Account Management System (CAMS).

In some industries customers may be required to have professional licenses in order to purchase regulated products. Examples include the dental industry, medical industry and pharmaceutical industry. Before a purchase order can be filled by manufacturer system 20 according to the techniques described herein, manufacturer system 20 may verify the identification and license status of customers 16. Customer management data 24 may include such identification and license data.

With respect to a dental industry, purchaser may generally refer to a dentist that buys a product (or the person at a dental practice that places an order on behalf of a dentist). Customer 16 may generally refer to a purchaser as the purchaser is recognized by distributors 28. Account may generally refer to the business entity making the purchase as identified in a CAMS database, which may be included in customer management data 24. Contact may generally refer to the individual person associated with an account (an account stored in the CAMS database).

While purchase orders and invoices are directed to accounts (e.g., as business entities), professional licenses are typically held by individuals (e.g., contacts). Because the products involved in the system may be classified as regulated medical devices, manufacturer system 20 (or distributor 28) may need to verify licensure. Accordingly, manufacturing system 20 may have to establish a link between an account to which a product is sold and the contact at that account having the license that allows the contact to purchase the product. In addition, to present customer specific prices to customers 16, manufacturer system 20 may need to match data from up to three data sources (e.g., customer 16, manufacturer system 20, and distributor 28) and have available three data bases (e.g., distributor database, manufacturer database (such as customer management data 24), and National Plan and Provider Enumeration System (NPPES) 40).

Customers 16 may be responsible for entering data to complete a purchase. However, while there are rarely errors in the item and quantity entered by the purchaser, information regarding the purchaser's name may be unreliable, because professional/corporate names change or take on various forms. Customer 16 may identify themselves by personal name instead of practice name. Address information is more reliable, but also may be less than clear due to address format (e.g., "line 2 information" such as suite number). In addition, few customers 16 may know their distributor specific customer number at the time they make purchase decision.

In addition, each distributor 28 may have a separate database that handles customer data differently. The process of matching and building a cross reference as a batch process between any one distributor 28 and CAMS may be relatively difficult. Multiplying this difficulty by the number of distributors 28 that may ultimately participate with manufacturer system 20 increases the complexity. Additionally, there may be no process in place to manage updates to each of the various distributor databases, and building a series of such updates may be resource intensive.

Aspects of this disclosure generally relate to compiling order data in an efficient manner. The CAMS database may include a master customer data set in customer management data. The CAMS database may include contact information (e.g., including a name and a national provider identifier (NPI) number). For example, the CAMS database may include NPI numbers for all or a portion (e.g., approximately 80%) of contacts. The CAMS database may also include account information (e.g., associated with the business entity, as noted above, including address information) for all or a substantial portion (e.g., 90% or more) of dentists and dental practices in the United States. The CAMS database may also contain a many to many cross reference between contacts (e.g., individuals) and accounts (e.g., business entities). The address information stored to the CAMS database may be standardized and verified through a national change of address (NCOA) database. The data in the CAMS database may be updated and refined through input from sales force professionals of manufacturer in the field, point of sales data from distributors 28, updates from out data vendors and input from customers 16 (e.g., registrations).

In some examples, in addition to the CAMS database, customer management data 24 includes a data set that includes customer point of sale data (POS), which distributors 28 send to the manufacturer on a periodic basis. This point of sale data may include information about purchases at the customer level and may include customer names and addresses (e.g., as recorded in a database maintained by distributors 28), as well as distributor specific customer numbers (e.g., as issued and maintained by distributors 28).

According to some aspects, POS data may be processed in a point of sale, enterprise (POSE) system included in manufacturer system 20, which matches the customer information supplied by distributors 28 to customer information of the manufacturer (e.g., customer and/or account information stored in the CAMS database). As described in greater detail below, the POSE may allow manufacturer system 20 to establish a match between an account identifier in a Transactional Customer Single Identity (TCSI) database of customer management data 24 and a distributor customer number.

Distributors 28 may include any third party responsible for completing an order initiated by manufacturer system 20. Examples include distributors, retailers, or any other third party seller/supplier. In the example of FIG. 1, distributors each include an electronic data interchange 32 and an order management system 36.

Electronic data interchange (EDI) 32 provides a system for distributors 28 to receive orders from an external source, such as manufacturer system 20. For example, EDI 32 may provide an electronic system form transmitting electronic data or business documents from one computer system to another computer system. Order management system 36 may be responsible for handling orders at distributors 28. For example, order management system 36 may be responsible for routing orders and/or generating documents necessary to complete the order at distributor 28. In some instances, electronic data interchange and/or order management system 36 may rely on a distributor customer number that uniquely identifies customers and is maintained by distributors 28.

The National Plan and Provider Enumeration System (NPPES) 40 includes a national database that provides a unique identification number for every dentist in the United States. Accordingly, NPPES 40 includes a listing of national provider identifiers 44, each of which uniquely identifies a customer 16. While reference is made to dentists (here and in other portions of this disclosure), a similar system may be included for other professionals (e.g., doctors, pharmacists, and the like) in other examples of system 12.

When fulfilling a customer order using manufacturer system 20, according to aspects of this disclosure, manufacturer system 20 may collect sufficient information from customers 16 (e.g., when completing an order using the website described above) to allow distributors 28 to identity customer 16. Additionally, in order to adequately record and manage customer activity, manufacturer system 20 may collect sufficient information to link customer 16 (online) to a customer stored in customer management data 24.

In some examples, manufacturer system 20 may require customers 16 to register and log in to a customer account maintained at manufacturer system 20. In other examples, manufacturer system 20 may only be available to customers who have existing accounts with participating distributors 28. Not only does this facilitate the flow of order information, it may also minimize the burden of non-qualified customers who would try place orders that ultimately could not be filled.

In an example, upon selecting products for purchase using manufacturer system 20 and selecting a "send order to distributor" option, manufacturer system 20 may prompt customers 16 to enter the following data: customer name; customer shipping address (line 1, line 2, city, state, zip); customer's distributor account number; customer email address; customer NPI number; customer phone number; charge to address if different than shipping address. In addition, order information may include the following data: item number; quantity (for each line item); price (as applied to order); shipping options; comments.

According to aspects of this disclosure, manufacturer system 20 may automatically populate some of the data fields listed above. For example, using various sets of data associated with customer management data 24, manufacturer system 20 may construct a data path that connects the required data. For example, manufacturer system 20 may construct an order file that uniquely identifies the customer, the distributor account number of the selected distributor 28, the order, and prices to be sent to the distributor 28. Based on the customers particular purchase levels (as determined by manufacturer system 20), certain customers 16 may receive different pricing from distributors 28, and identification of the customer 16 and their related information will ensure that the customer 16 receives proper pricing.

To prepare the order file described above, manufacturer system 20 may build a set of database queries and data table joins to construct a "customer file" that contains, for each NPI number of a customer 16 (e.g., as stored in customer management data 24), all cross referenced accounts and their corresponding distributor customer account numbers. This data file may be loaded into the customer database of manufacturer system 20.

In some examples, as noted above, a Technology Consultants Service International (TCSI) database includes customer information as well as distributor customer numbers. The TCSI database may be accessible by CAMS and may be populated as an automated data feed on a periodic basis (e.g., daily) from CAMS. The data may include a CAMS account identifier. Accordingly, manufacturer system 20 may establish a connection (a match) between the CAMS account identifier (which identifies a business identity) and the appropriate distributor customer number associated with that account.

In addition, as a fully relational database and as noted above, CAMS may contain a many to many relationship cross reference table that relates all possible CAMS contact identifiers (which identify users e.g., dentists, doctors, pharmacists, or the like) to each account identifier. Accordingly, manufacturer system 20 may establish a connection (a match) between a CAMS contact identifier and a CAMS account identifier, which also provides a connection between the CAMS account identifier and the distributor customer number associated with that account, as noted above. In addition, the CAMS contact identifier may contain a data element for the NPI number of the customer, which provides a connection (a match) between the NPI number and the CAMs contact identifier, which may be used to determine a distributor customer number using the CAMS account identifier discussed above.

In this way, the manufacturer system 20 may use one piece of customer information (entered by customer 16) to automatically populate other information in the website to complete a purchase. For example, using an NPI number of a customer 16, manufacturer system 20 may determine contact information (e.g., address information, phone numbers, email addresses, and the like), account information (e.g., address information, phone numbers, email addresses, and the like), and/or distributor customer numbers. Accordingly, a customer does not need to know a particular distributor customer number associated with a selected distributor when entering an order in manufacturer system 20.

Manufacturer system 20 may transmit data (e.g., an order file) to distributors 28 using any suitable medium, such as, for example, electronic media including but not limited to a secure File Transfer protocol (FTP) site, a fax, e-mail. Manufacturer system 20 may send order information to distributors 28 in various file formats (e.g., .csv, .txt, .xml). When customer 16 initiates the data transfer, customer 16 may receive an acknowledgement that the manufacturer will follow through with the order.

According to aspects of this disclosure, manufacturer system 20 described above may allow distributor 28 to automate the order entry process in their systems. For example manufacturer system 20 sends the information to an electronic address specified by the distributor. This electronic address may be a central order entry point or a variable address depending on customer location. Additionally, manufacturer system 20 may be directly incorporated into the distributor order management system 36, thus making it possible to transmit the customer order directly into the distributor order management system 36.

Each distributor 28 may set up an internal process flow to receive the order information from manufacturer system 20 and enter the order into their commerce/supply chain functionality. Once the information is entered into order management system 36, distributor 28 may perform standard pricing (or customer specific pricing) and invoicing. Distributor 28 may then deliver the ordered product to customer 16. In some instances, distributor 28 may send an acknowledgement back to manufacturer system 20, in case the customer makes an inquiry to the manufacturer about the status of the order.

Accordingly, in an example according to the techniques of this disclosure, manufacturer system 20 may provide product information to a potential customer through a website, provide a means for the customer express a purchase intent, prompt the customer to enter identifying information on the website, provide a means for the customer to submit an order on the website, transfer the order information from the website to the website of a distributor or retailer without transferring the customer to the website of the distributor, and provide an order acknowledgement to the customer on the website.

As noted elsewhere, while certain examples are described with respect to the dental industry, the techniques may be broadly applicable to other industries which utilize an indirect sales model (i.e., when a manufacturer sells products through a third party such as a distributor or retailer).

Figure 2:
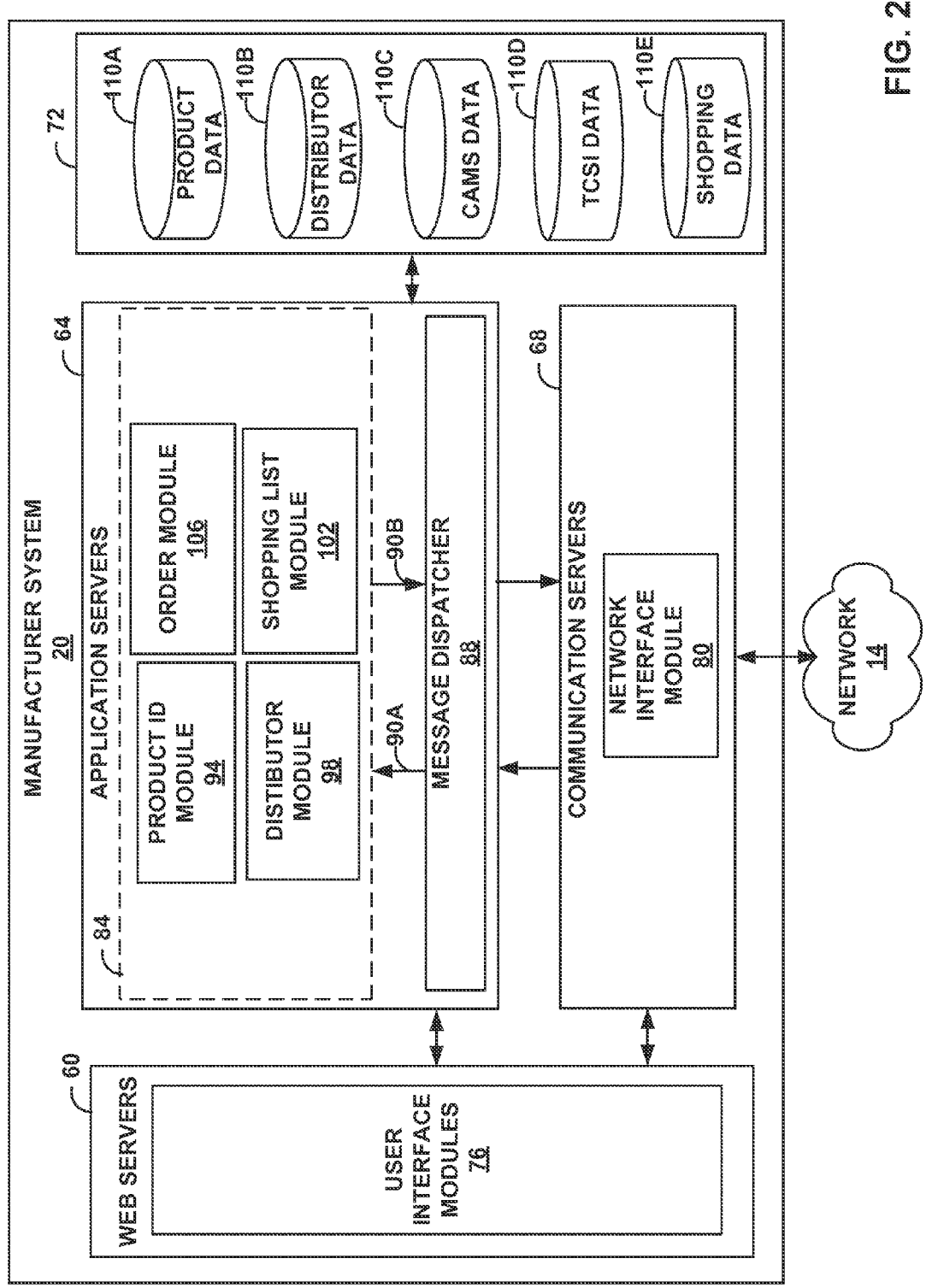
FIG. 2 is a block diagram illustrating further details of one example implementation of the manufacturer system shown in FIG. 1.

FIG. 2 is a block diagram illustrating further details of one example implementation of manufacturer system 20 shown in FIG. 1. In general, manufacturer system 20 includes one or more computing devices (e.g., computing servers that provide operating environments for various software modules). These servers can generally be categorized as web servers 60, application servers 64, communication servers 68, and database servers 72. Although these servers are illustrated separately in FIG. 2, manufacturer system 20 may, in various implementations, be realized by a single computing device, or a plurality of cooperating computing devices, as the case may be.

Web servers 60 provide an interface by which one or more users, e.g., consumers, communicate with manufacturer system 20 via network 14. Web servers 60 may provide an environment for interacting with remote user(s) according to user interface modules 76, which can include Active Server Pages, web pages written in hypertext markup language (HTML) or dynamic HTML, Active X modules, Lotus scripts, Java scripts, Java Applets, Distributed Component Object Modules (DCOM) and the like.

Although illustrated as "server side" software modules executing within an operating environment provided by web servers 60, user interface modules 76 could readily be implemented as "client-side" software modules executing on computing devices operated by remote customers 16 shown in FIG. 1. User interface modules 76 could be implemented as, for example, Active X modules executed by a web browser for execution on the remote computing devices.

Communication servers 68 provide an operating environment for various interfaces and/or modules that provide the ability to establish direct connections with one or more remote devices (computing devices operated by customers 16) and/or disparate data systems of various enterprises (such as distributors 28). As shown in FIG. 2, network interface module 80, while operating within an environment provided by communication servers 68, may enable manufacturer system 20 to communicate over network 14, e.g., with customers 16, distributors 28, or other network connected entities.

Application servers 64 provide an operating environment for application software modules 84, which provide the underlying logic and functionality for implementing the various techniques ascribed to manufacturer system 20 herein. Message dispatcher 88 receives communications from communication servers 68, and issues inbound messages 90A to application software modules 84 to process the communications. In particular, communication servers 68 may receive, using network interface module 80, communications from remote devices, and, in turn, forward the communications to message dispatcher 88. Message dispatcher 88 determines the appropriate application software modules 84 for processing each communication, and dispatches one or more inbound message 90A to the identified modules. In a similar manner, application software modules 84 may generate outbound messages 90B to communicate with remote devices over network 14.

Application software modules 84 may include a number of modules including product ID module 94, distributor module 98, shopping list module 102, and order module 106. Application software modules 84 interact with database servers 72 to access a number of data stores 110, including product data 110A, distributor data 110B, CAMS data 110C, TCSI data 110D, and shopping list state data 110E. Data stores 110 may be implemented in a number of different forms including data storage files, or as a database management system (DBMS). The database management system may be a relational (RDBMS), hierarchical (HDBMS), multidimensional (MDBMS), object oriented (ODBMS or OODBMS) or object relational (ORDBMS), or other database management system. Furthermore, although illustrated separately, data stores 110 could be combined into a single database or other data storage structure. Data stores 110 could, for example, be implemented as a single relational database (such as that marketed by Microsoft® Corporation under the trade designation 'SQL SERVER').

In general, product ID module 94 handles and/or processes identification of various products that a consumer may add to or remove from a shopping list. For instance, product ID module 94 may receive, as part of inbound messages 90A, an identification of a product. In turn, product ID module 94 may map the product identification included in inbound messages 90A to data stored as part of product data 110A.

Based on the mapping, product ID module 94 may supply product information, such as a description, or an alternate product if the identified product is unavailable, via outbound messages 90B to communication servers 68. In instances where product ID module 94 identifies an alternate product, product ID module 94 may apply criteria such as product preferences and/or dietary restrictions supplied by a user.

Distributor module 98 determines which distributors that are associated with the system carry the respective products. For example, based on product information (e.g., from product ID module 94) distributor module 98 may map the product identification included in inbound messages 90A to data stored as part of distributor data 110B. Distributor module 98 may provide a list of available distributors, in cases in which more than one distributor is available to supply a particular product.

As shown in FIG. 2, application modules 84 may also include shopping list module 102. In various implementations, shopping list module 102 is configured or otherwise operable to populate and depopulate a shopping list for a consumer (or group of consumers) based on information received from client devices via network 14. In certain specific examples, shopping list module 102 may update information included in data stores 110, such as shopping list state data 110E, in order to populate or depopulate the shopping list. For instance, shopping list module 102 may add a product identification (or alternatively, generate a reference, such as a pointer, to a product identification in product data 110A) in response to receiving a request to add a product to a shopping list. Conversely, shopping list module 102 may remove a product identification (or alternatively, delete a reference to a product identification in product data 110A) in response to receiving a request to remove an item from the shopping list. As noted, shopping list module 102 may populate and depopulate the shopping list based on requests received from diverse client devices, thereby enabling collaborative updating of shopping list information by consumers who share common purchasing needs.

Order module 106 may, according to aspects of this disclosure, generate an order file for submission to a distributor. For example, order module 106 may gather information from one or more of data stores 110 (such as CAMS data 110C and/or TCSI data 110D) in order to generate an order file based on information from the customer.

In an example for purposes of illustration, order module 106 may receive an inbound message 90A containing an NPI number associated with a customer (as input by the customer). Order module 106 may poll CAMS data 110C and/or TCSI data 110D using the received NPI number. For example, order module 106 may poll CAMS data 110C for a contact associated with the received NPI number. CAMS data 110C may include account data as well as distributor specific data (e.g., from TCSI data 110D) that is associated with the contact.

Accordingly, order module 106 may receive contact information (e.g., address information, phone numbers, email addresses, and the like), account information (e.g., address information, phone numbers, email addresses, and the like), and/or distributor customer numbers (e.g., uniquely identifying the customer to the distributor) based on the received NIP number. Order module 106 may automatically populate an order file based on the information from data stores 110. Accordingly, the customer does not need to know all of the details (such as a distributor customer number) associated with an order when entering an order in manufacturer system 20.

Order module 106 may send an outbound message 90B containing the completed order file upon a prompt by the customer (e.g., the customer initiates transfer of the order via UI modules 76). The order file may be in a preferred electronic format of the distributor, thereby allowing the order file to be automatically received an entered into an order management system at the distributor. According to aspects of this disclosure, order module 106 transmits the order file to the distributor without transitioning the customer to a website of the distributor.

In this manner, manufacturer system 20 represents a mechanism for e-commerce that is configured to perform a process that includes providing, at a website of a manufacturer, an indication of one or more products for sale by the manufacturer, where the one or more products are distributed by a distributor that is distinct from the manufacturer, receiving, at the website of the manufacturer, an indication of an intent to purchase the one or more products by a customer and an identification number that uniquely identifies the customer, in response to receiving the indication of the intent to purchase and the customer identification number, generating order information comprising data identifying the one or more products and data identifying the customer, and initiating an order with the distributor using the order information without transitioning to a website of the distributor.

Figure 3:
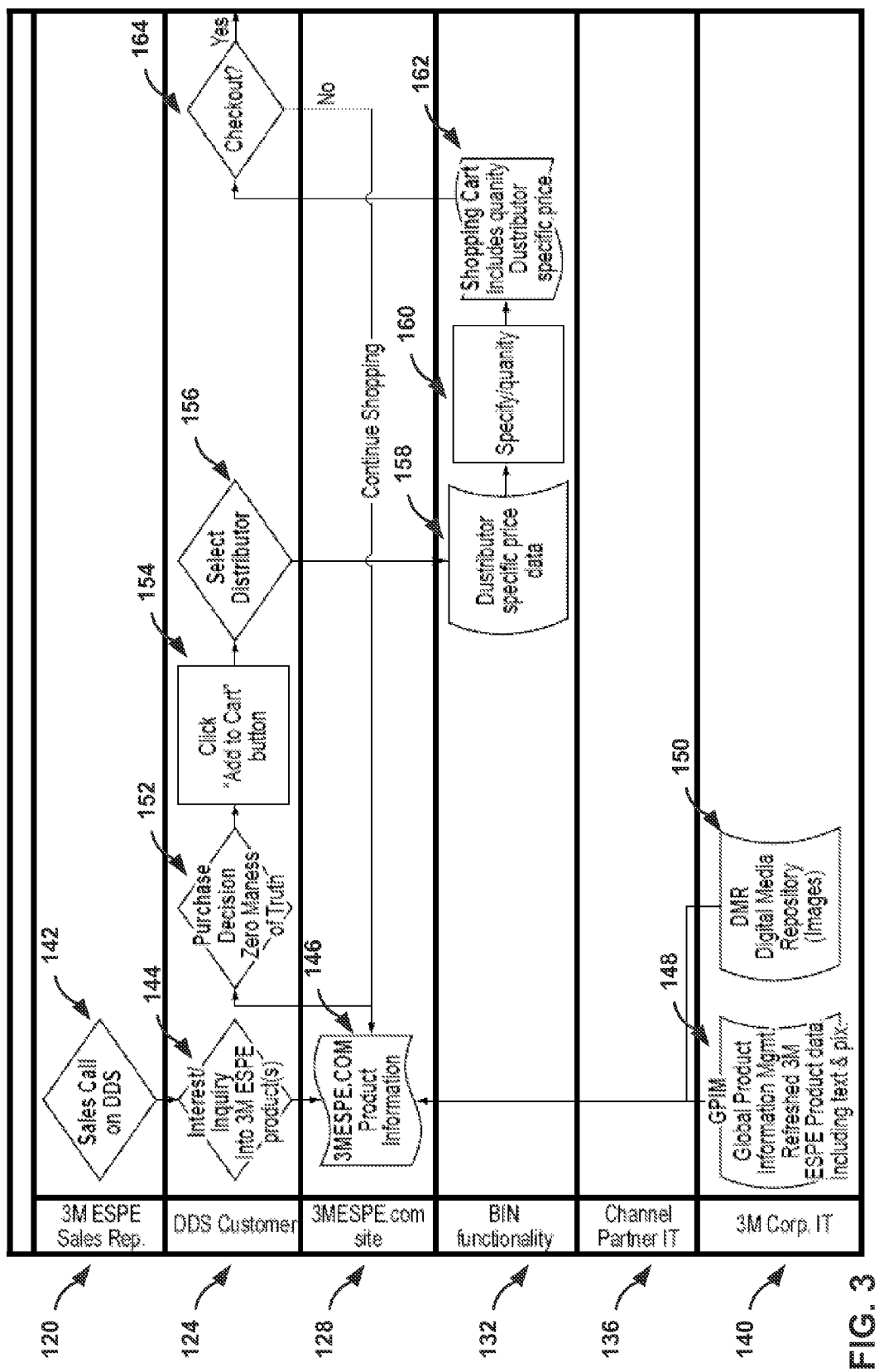
FIG. 3 is a flow diagram illustrating an electronic commerce process, according to aspects of this disclosure.

FIG. 3 is a flow diagram illustrating an electronic commerce process, according to aspects of this disclosure. In general, FIG. 3 illustrates interactions between a sales representative 120, a customer 124, a website of a manufacturer 128, a manufacturer order system 132, an information technology (IT) channel of a partner of the manufacturer 136 (such as a distributor associated with the manufacturer), and IT of the manufacturer 140.

In the example of FIG. 3, sales representative 120 presents products to customer 124 on a sales call (142). During and/or after the sales call, customer 124 may present interest in one or more products of the manufacturer (144). Customer 124 may view products sold by the manufacturer at the website of the manufacturer 128 to gain product information (146). This product information may be provided by a product information database (148) and/or a media repository (150).

Upon making a purchase decision (152), customer 124 may click an "add to cart" button of the website 128 (154). Customer 124 may also select a distributor (when there is more than one distributor available (156). Upon selecting a distributor, manufacturer order system 132 may attain a distributor specific price (158) based on a specified quantity being ordered (160) and may include such data in the shopping cart (162). The manufacturer order system 132 may maintain the price information data. After reviewing the shopping cart, customer 124 may determine whether to checkout or continue shopping (164).

Figure 4:
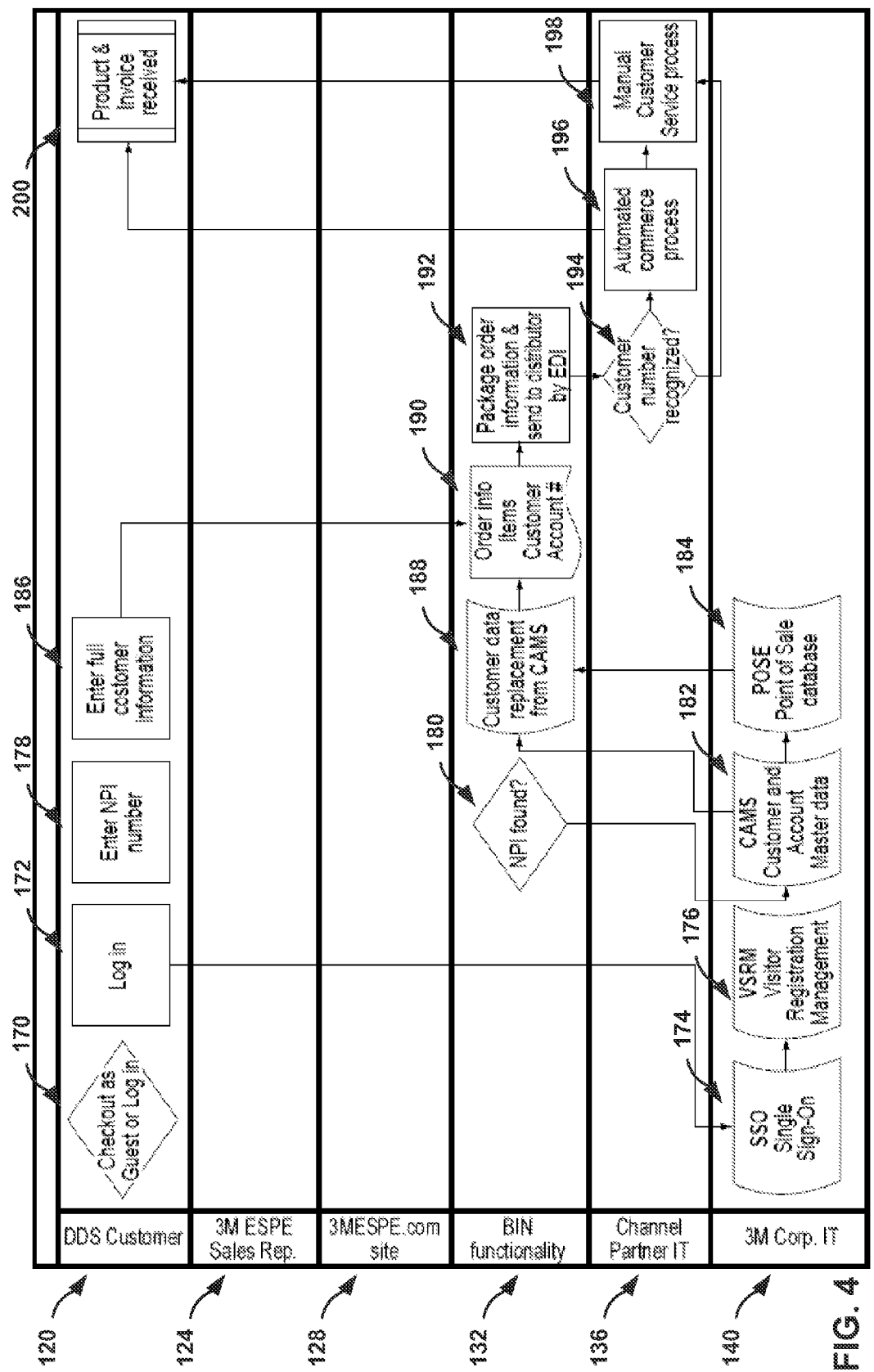
FIG. 4 is a flow diagram illustrating another electronic commerce process, according to aspects of this disclosure.

FIG. 4 is a flow diagram illustrating another electronic commerce process, according to aspects of this disclosure. In general, FIG. 4 illustrates additional interactions between the sales representative 120, the customer 124, the website of a manufacturer 128, the manufacturer order system 132, the information technology (IT) channel of a partner of the manufacturer 136 (such as a distributor associated with the manufacturer), and the IT of the manufacturer 140 shown in FIG. 3.

In the example of FIG. 4, customer 120 logs in using account information or checks out as a guest (170). Upon log in by customer 120 (172), the IT channel of the manufacturer performs a single sign on process (174) and a visitor registration management process (176) to identify the customer. Customer 120 also enters an NPI number that uniquely identifies the customer, for example, in a database of registered dentists (178).

According to aspects of this disclosure, manufacturer order system 132 determines whether the NPI number of the customer is found (180), for example, in a CAMs database (182) and/or a POSE database (184) maintained by the IT of manufacturer 140. As described above, the IT of manufacturer 140 may maintain one or more relational databases that store information of the customer, including contact information, account information, distributor customer numbers, and the like.

In some instances, customer 120 may enter customer information (186). However, according to aspects of this disclosure, manufacturer order system 132 may automatically populate customer information from the CAMS database and/or POSE database (188). In some instances, the manufacturer order system 132 may provide a variety of customer information (e.g., multiple billing addresses, shipping addresses, and the like) for selection by the customer 120. In any case, the manufacturer order system 132 determines order information including, for example, data that identifies the products being purchased, address information, and a distributor customer number that uniquely identifies the customer at the distributor (as maintained by the distributor selected in FIG. 3) (190). The manufacturer order system 132 may assemble an order file with all of the determined order information and send the order file to the IT channel of the distributor 136 (192).

Upon receiving the file, the IT channel of the distributor 136 may determine whether the distributor customer number is recognized (194) and if so, may complete an automated commerce process to deliver the ordered product to customer 120 (196). FI the distributor customer number is not recognized, the distributor may manually process the order (198). In any case, the customer then receives the product and an invoice for the received product (200).

Figure 5:
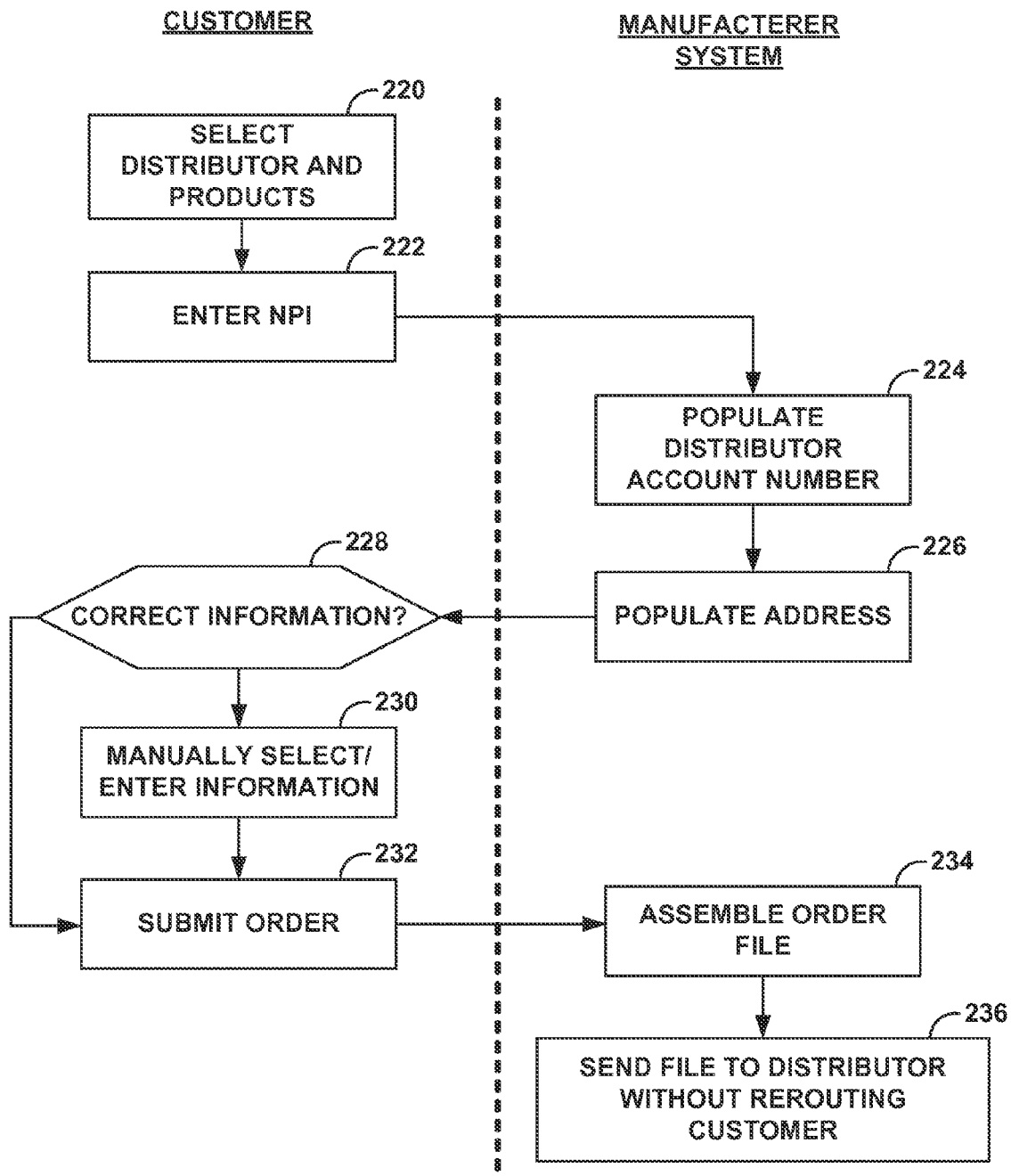
FIG. 5 is a flow diagram illustrating interactions between a customer and a manufacturer system, according to aspects of this disclosure.

FIG. 5 is a flow diagram illustrating an electronic commerce process for completing a customer order at a manufacturer website maintained by a manufacturer system. In the example of FIG. 5, using the website, a customer selects a distributor to which an order will be sent (220). The customer may also select the items of interest and place the items in a shopping cart of the website. The manufacturer system may use a pricing file provided by the selected distributor to apply a price to the item(s) in the shopping cart.

When the customer is ready to complete the purchase, the customer may enter an NPI number that uniquely identifies the customer (222). In the example of FIG. 5, based on the entered NPI number, the manufacturer system determines and populates a distributor account number (e.g., traceable to a customer file generated by the manufacturer system) (224) and determines and populates address information associated with the customer (e.g., traceable to a CAMS account ID) (226).

If the NPI number of the customer is associated with multiple account locations (but filtered by distributor) the customer is given the option of determining whether the information is correct (228) selecting the location of choice. If the NPI number is not associated with any account locations for the selected distributor, the purchaser is given the option of entering their address and distributor information manually (230). The customer then initiates the purchase by submitting the order (232).

This causes the manufacturer system to assemble an order file (in particular format, such as an EDI 850 format) containing the items and quantity selected, the NPI number supplied by the purchaser, the name and address information supplied from a CAMS database, a distributor customer account number supplied by the distributor, and prices for items generated by a lookup of item and customer account number at the distributor (234).

The manufacturer system may send the order to a distributor without rerouting the customer from the manufacturer website to a website of the distributor (236). In some examples, the manufacturer system may send the order to the distributor by FTP, or may place the order in an order data file where an order management system of the distributor is able to pick up the order by FTP. From there the transaction is managed by the distributor in their ordinary commercial processes.

Figure 6:
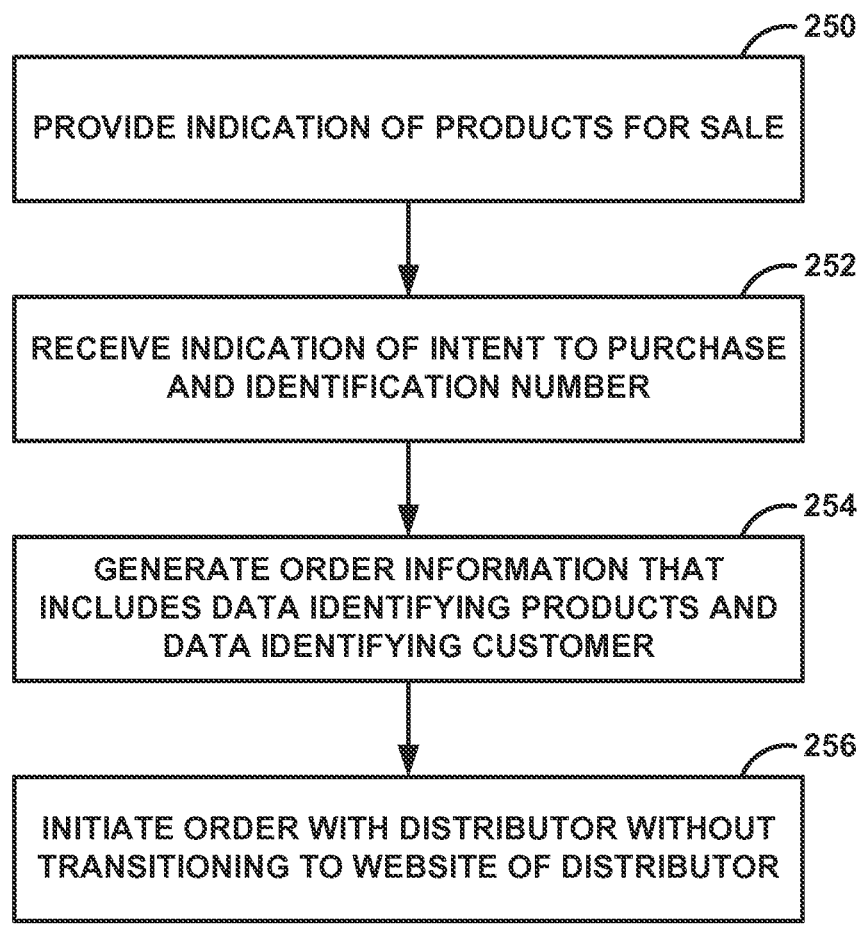
FIG. 6 is a flow diagram illustrating an electronic commerce process for completing a customer order.

FIG. 6 is another flow diagram illustrating an electronic commerce process for completing a customer order at a manufacturer website. In the example of FIG. 6, the website provides an indication of one or more products for sale by the manufacturer (250). The website receives an indication of intent to purchase one or more of the products by a customer as well as a customer identification number that uniquely identifies the customer at the manufacturer (252). For example, the customer may select a distributor from one or more distributors available to supply the products and may place the products in a shopping cart maintained by the website. The customer may also enter an NPI number that uniquely identifies the customer in a database maintained by the manufacturer. While reference is made to an NPI number here and elsewhere in this disclosure, it should be understood that a variety of unique identifiers may be maintained by a manufacturer and are included in the scope of this disclosure. That is, another unique identifier may be associated with the customer, and an NPI number is not necessary to carry out the techniques described herein.

The website may generate order information that includes data identifying the products and data identifying the customer (254). The website may generate the order information in response to a prompt from the customer (e.g., a prompt to "checkout"). The website may generate the order information by polling one or more databases maintained by the manufacturer or distributor based on the customer identification number described above. The website may automatically populate one or more fields of the website using the data identifying the customer, including a distributor customer number that uniquely identifies the customer at a database maintained by the distributor.

The website may then initiate an order with the distributor without transitioning to a website of the distributor (256). That is, the order submission process may be "behind the scenes," such that the customer is not exposed to the transfer of order information between the manufacturer and the distributor.

It is to be recognized that depending on the example, certain acts or events of any of the techniques described herein (including those described in the flow diagrams of FIGS. 3-6) can be performed in a different sequence, may be added, merged, or left out altogether (e.g., not all described acts or events are necessary for the practice of the techniques).

Certain aspects of this disclosure have been described with respect to dental sales for purposes of illustration. However, the techniques described in this disclosure may be useful for selling of other items. For example, the techniques may be implemented to sell medical devices or other items by a manufacturer of such items.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The examples described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure.

Various examples have been described. These and other examples are within the scope of the following claims.

What is claimed is:

1. A method for electronic commerce, the method comprising:
   providing, at a website of a manufacturer, an indication of one or more products for sale by the manufacturer, wherein the one or more products are distributed by a distributor that is distinct from the manufacturer;
   receiving, at the website of the manufacturer, an indication of an intent to purchase the one or more products by a customer and a customer identification number that uniquely identifies the customer in a database of the manufacturer;
   in response to receiving the indication of the intent to purchase, automatically populating information at the website of the manufacturer based on the customer identification number, wherein automatically populating the information at the website of the manufacturer based on the customer identification number includes:
      identifying, from a database of the manufacturer and based on the customer identification number, an account identifier associated with the customer and a customer contact comprising address data, the identifying further based on a many-to-many cross reference of the database between account identifiers and customer contacts associated with the account identifiers;
      determining, based on the account identifier, a distributor account number that uniquely identifies the customer at a database maintained by the distributor;
      generating order information comprising data identifying the one or more products, the address data, and the distributor account number; and
   initiating, using the website of the manufacturer, an electronic order with the distributor for fulfillment of the order by the distributor, wherein initiating the electronic order comprises initiating the electronic order at a computing system of the distributor that comprises the database of the distributor, and wherein initiating the electronic order comprises sending the order information directly to the computing system of the distributor at the web site of the manufacturer without transitioning from the web site of the manufacturer to a web site of the distributor.

2. The method of claim 1, wherein generating the order information generating address data that comprises more than one address for selection by the customer.

3. The method of claim 1, wherein receiving the identification number comprises receiving a National Provider Identifier (NPI) associated with the customer.

4. The method of claim 1, further comprising, in response to receiving the indication of the intent to purchase and the identification number, determining a customer specific price for the one or more products based on the identification number that uniquely identifies the customer, wherein the customer specific price is maintained by the distributor.

5. The method of claim 4, further comprising receiving indication of a selection of the distributor from more than one available distributor.

6. The method of claim 1, wherein initiating the order with the distributor comprises automatically sending the order information to an order management system maintained by the distributor.

7. The method of claim 6, wherein sending the order information to the order management system maintained by the distributor comprises transmitting a file via file transfer protocol.

8. A non-transitory computer-readable medium storing instructions that, when executed, cause one or more processors to:
   provide, at a website of a manufacturer, an indication of one or more products for sale by the manufacturer, wherein the one or more products are distributed by a distributor that is distinct from the manufacturer;
   receive, at the website of the manufacturer, an indication of an intent to purchase the one or more products by a customer and a customer identification number that uniquely identifies the customer in a database of the manufacturer;
   in response to receiving the indication of the intent to purchase, automatically populate information at the website of the manufacturer based on the customer identification number, wherein to automatically populate the information at the website of the manufacturer based on the customer identification number, the instructions cause the one or more processors to:
      identify, from a database of the manufacturer and based on the customer identification number, an account identifier associated with the customer and a customer contact comprising address data, the identifying further based on a many-to-many cross reference of the database between account identifiers and customer contacts associated with the account identifiers;

determine, based on the account identifier, a distributor account number that uniquely identifies the customer at a database maintained by the distributor;

generate order information comprising data identifying the one or more products, the address data, and the distributor account number; and initiate, using the website of the manufacturer, an electronic order with the distributor for fulfillment of the order by the distributor, wherein initiating the electronic order comprises initiating the electronic order at a computing system of the distributor that comprises the database of the distributor, and wherein initiating the electronic order comprises sending the order information directly to the computing system of the distributor at the web site of the manufacturer without transitioning from the web site of the manufacturer to a website of the distributor.

9. The non-transitory computer-readable medium of claim 8, wherein to generate the order information, the instructions cause the one or more processors to generate address data that comprises more than one address for selection by the customer.

10. The non-transitory computer-readable medium of claim 8, wherein receiving the identification number comprises receiving a National Provider Identifier (NPI) associated with the customer.

11. The non-transitory computer-readable medium of claim 8, further comprising, in response to receiving the indication of the intent to purchase and the identification number, instructions that cause the one or more processors to determine a customer specific price for the one or more products based on the identification number that uniquely identifies the customer, wherein the customer specific price is maintained by the distributor.

12. The non-transitory computer-readable medium of claim 8, wherein to initiate the order with the distributor, the instructions cause the one or more processors to automatically send the order information to an order management system maintained by the distributor.

13. The non-transitory computer-readable medium of claim 12, wherein to send the order information to the order management system maintained by the distributor, the instructions cause the one or more processors to transmit a file via file transfer protocol.

14. A system for conducting electronic commerce, the system comprising:

an interface; and one or more programmable processors configured to:

provide an indication of one or more products for sale by a manufacturer, wherein the one or more products are distributed by a distributor that is distinct from the manufacturer;

receive, at the interface, an indication of an intent to purchase the one or more products by a customer and a customer identification number that uniquely identifies the customer in a database of the manufacturer;

in response to receiving the indication of the intent to purchase, automatically populate information at the website of the manufacturer based on the customer identification number, wherein to automatically populate the information at the website of the manufacturer based on the customer identification number, the one or more processors are configured to:

identify, from a database of the manufacturer and based on the customer identification number, an account identifier associated with the customer and a customer contact comprising address data, the identifying further based on a many-to-many cross reference of the database between account identifiers and customer contacts associated with the account identifiers;

determine, based on the account identifier, a distributor account number that uniquely identifies the customer at a database maintained by the distributor;

generate order information comprising data identifying the one or more products, the address data, and the distributor account number; and initiate, using the website of the manufacturer, an electronic order with the distributor for fulfillment of the order by the distributor, wherein initiating the electronic order comprises initiating the electronic order at a computing system of the distributor that comprises the database of the distributor, and wherein initiating the electronic order comprises sending the order information directly to the computing system of the distributor at the web site of the manufacturer without transitioning from the web site of the manufacturer to a website of the distributor.

* * * * *